United States Patent [19]

Moore et al.

[11] Patent Number: 5,120,229
[45] Date of Patent: Jun. 9, 1992

[54] DENTAL TEACHING MODEL

[75] Inventors: Dorsey J. Moore; Connie L. Drisko, both of Kansas City, Mo.

[73] Assignee: The Curators of the University of Missouri, Columbia, Mo.

[21] Appl. No.: 579,620

[22] Filed: Sep. 10, 1990

[51] Int. Cl.$^5$ ............................................. G09B 23/28
[52] U.S. Cl. ............................... 434/263; 434/264; 433/74
[58] Field of Search ............... 434/256, 263, 264, 267, 434/270; 433/74, 196

[56] References Cited

U.S. PATENT DOCUMENTS

| | | | |
|---|---|---|---|
| 707,810 | 8/1902 | Wenker | 434/263 |
| 739,980 | 9/1903 | Bryant | 434/263 |
| 1,045,920 | 12/1912 | Wenker | 434/263 |
| 1,108,290 | 8/1914 | Weisse | 434/263 |
| 1,512,745 | 10/1924 | Carey | 434/263 |
| 1,598,052 | 8/1926 | Chayes | 434/264 |
| 1,948,059 | 2/1934 | Baugh | 434/263 |
| 2,005,114 | 6/1935 | Spitzer et al. | 434/263 |
| 2,657,462 | 11/1953 | Arrow | 434/263 |
| 2,750,670 | 6/1956 | Vigg | 434/264 |
| 2,780,002 | 2/1957 | Shea et al. | 434/263 |
| 3,458,936 | 8/1969 | Schulz et al. | 434/263 |
| 3,780,439 | 12/1973 | Manor et al. | 434/263 |
| 3,886,661 | 6/1975 | Neill | 434/263 |
| 4,226,593 | 10/1980 | Cohen et al. | 433/37 X |
| 4,350,154 | 9/1982 | Feldbau | 433/37 X |
| 5,030,102 | 7/1991 | Lang | 434/263 |

FOREIGN PATENT DOCUMENTS 2122796 1/1984 United Kingdom ............... 434/263

OTHER PUBLICATIONS

Moore et al., *Evaluation of Polymeric Materials for Maxillofacial Prosthetics*, Sep. 1977, pp. 319–326.

Kuba et al., *A Model for the Demonstration of Sutering Techniques*, Sep. 1972, pp. 573–574.
Clark et al., *Preclinical Laboratory Course in Root Planning Technic*, Dec. 1969, pp. 455–460.
Article by Trygive Lie et al., entitled Computerized Evaluation of the Effectiveness of Subgingival Scaling in Jaw Models, J. Clinical Periodontol, 1987; 14: 149–155.
Article by R. Jack Cassingham et al., A Laboratory Technique for Teaching Root Resection, J. Periodontol, Mar. 1979, pp. 148–150.
Article by L. G. Denner Brown entitled The Design and Construction of Models For Use in Teaching Periodontal Techniques, Dental Practitioner, Mar., 1969, pp. 243–244.
Article by G. S. Beagrie entitled Teaching Technique For Periodontal Surgery, British Dental Journal, vol. 112 (1962) pp. 251–252.
Article of Robert D. Meyer et al., entitled Fabrication of a Teaching Aid for Dental Soft Tissue Management and Suturing, Journal of the American Dental Association, vol. 118, Mar., 1989, pp. 345–346.
Article by Frederick C. Judy et al., entitled A Laboratory Technique for Teaching Osseous Surgery, Journal of Periodontol, Sep. 1976, pp. 538–542.

Primary Examiner—Richard J. Apley
Assistant Examiner—Karen A. Richard
Attorney, Agent, or Firm—Gerstman & Ellis

[57] ABSTRACT

A dental model of teeth mounted in a jaw comprises an artificial jaw member defining tooth-receiving sockets. The teeth have roots, the roots being removably seated in the sockets and bonded there by elastomeric adhesive, whereby the teeth exhibit a resiliently seated characteristic similar to that of the natural teeth in a human jaw. Also, a preformed, artificial gingiva may be applied which exhibits improved, lifelike characteristics for a practice experience that is closer to clinical reality.

19 Claims, 1 Drawing Sheet

U.S. Patent  June 9, 1992  5,120,229
Fig. 1
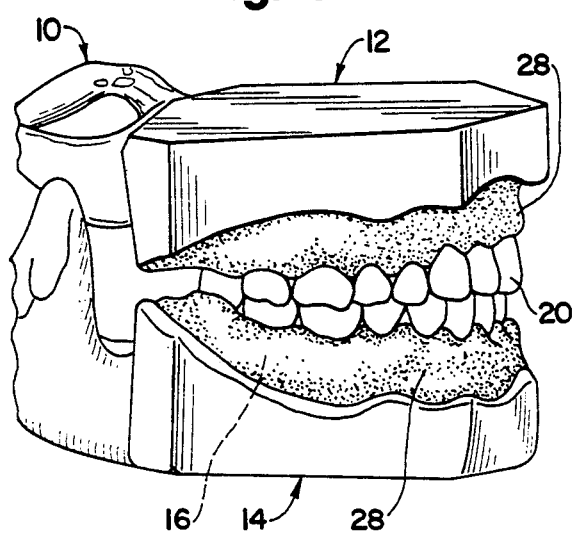
Fig. 2
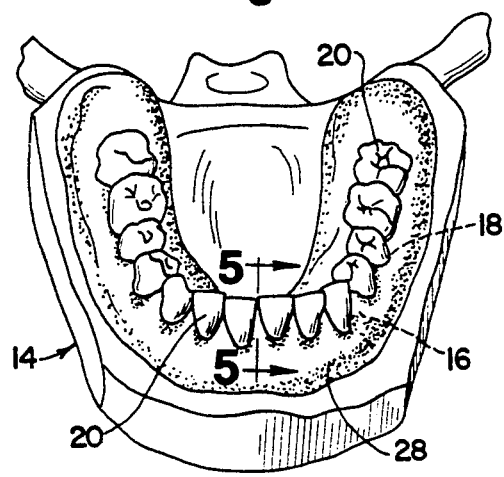
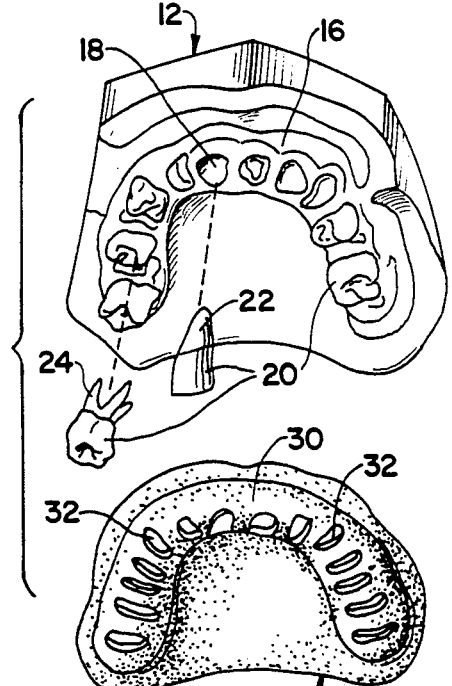
Fig. 3
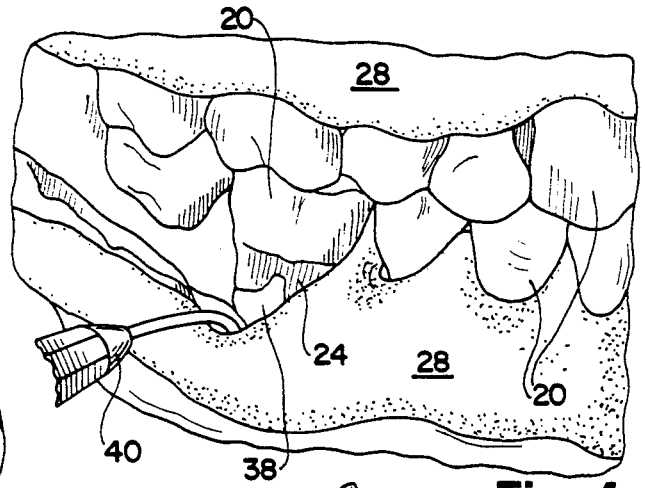
Fig. 4
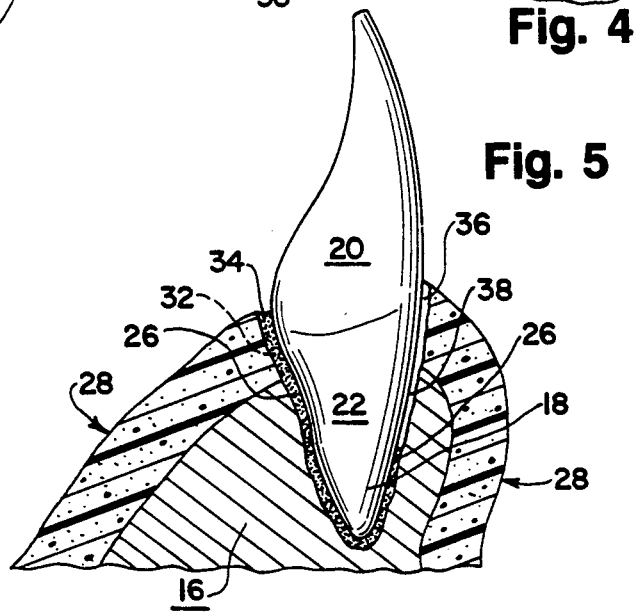
Fig. 5

DENTAL TEACHING MODEL

BACKGROUND OF THE INVENTION

Dental models are used in the teaching of dental students, comprising an artificial jaw typically made of plaster or plastic, with teeth mounted therein in a lifelike manner. Such dental models have been used to teach calculus detection and probing skills, subgingival scaling, and surgical techniques. For example, an artificial calculus can be painted onto the teeth, while an artificial gingiva or gum, made of an elastomer, may be applied to the dental model in a position corresponding to the natural position of the gum. Thus, the student can gain experience in dealing with dental procedures that involve spreading the "gum" away from the tooth or cutting of the gum.

There is of course a need to provide periodontal teaching models which closely simulate the actual tactile experience and the general "feel" of an actual living patient. The models of the prior art have exhibited a substantial tactile difference from the real world of dentistry, in that the teeth in the artificial jaw, unlike real teeth in a real jaw, are generally rigidly positioned. Real, living teeth of a patient exhibit a certain, very small, resilient, flexible mounting, which changes the tactile experience of a dental procedure performed on real patients from that of students practicing on prior art dental models. Additionally, the gingiva or gum, when used on the dental models of the prior art, has not provided a close simulation to the real gum tissues of actual dentistry. Hence, the experience of the novice working with the gum of his first dental patient is substantially different from the prior art dental models upon which he may have practiced.

Additionally, there is a need to provide the novice dentist with a substantial variety of tooth arrays in dental models where the teeth are presented with varying degrees of malocclusion, calculus layers, receding "gums", and the like. In the prior art, this is difficult to accomplish because, often, a new dental model comprising jaw and teeth must be provided for each situation.

In accordance with this invention, dental models are provided which have a great variability of use, in that the teeth are easily removable from the artificial jaw, so that different tooth and gum configurations, representing different dental clinical situations, can be applied to the same jaw. This permits frequent reuse of the jaw, and often the teeth, in a variety of simulated clinical situations.

Additionally, the teeth, as mounted in the artificial jaw in accordance with this invention, exhibit a certain resilience of mounting that more closely simulates the actual clinical situation found in the teeth of a patient, when compared with the dental models of the prior art.

Furthermore, the dental model of this invention may carry an artificial gingiva which more closely simulates the actual gum tissue of a dental patient than in prior art situations, to provide the novice dentist with a training situation which is substantially closer to clinical reality.

DESCRIPTION OF THE INVENTION

This invention relates to a dental model of teeth mounted in a jaw. An artificial jaw member is provided defining tooth-receiving sockets. Teeth having roots are also present, the roots being removably seated in the sockets. An elastomeric adhesive bonds the roots to the walls of the sockets in which the teeth reside. As the result of this, the teeth exhibit a resiliently seated characteristic that is similar to that of natural teeth in a human jaw. Additionally, the teeth may be readily removed from the jaw member for reuse thereof by cutting or tearing of the elastomeric adhesive. Thus, after the dental exercise has been performed by the novice dentist, the teeth and jaw may be separated, the elastomeric adhesive removed by easy scraping or the like, and a new dental model may be formed, with perhaps a different arrangement of teeth in the jaw, illustrating a different simulated clinical situation. The roots of the teeth are once again held by more elastomeric adhesive, to bond the roots of the teeth to the walls of the jaw sockets in which the teeth reside.

The elastomeric adhesive is typically at least 0.1 millimeter in thickness about most of the root area of the teeth, to provide general spacing between the roots of the teeth and the walls of the sockets. Thus, a desired, small amount of flexibility of mounting, simulating the actual clinical situation of a dental patient, can be provided.

While model teeth may be used, for example, teeth made of epoxy molding compound with anatomically-shaped roots, real teeth which have been extracted from patients may also be used, if desired. The tooth-receiving sockets of the jaw member may be somewhat oversized so that the teeth fit loosely therein, being retained by the elastomeric adhesive. Thus, the teeth may be positioned in the socket in a variety of desired angles to simulate malposed teeth, in order to mimic a periodontally-compromised condition. Alternatively, the teeth may fit relatively closely in the sockets.

Typically, the elastomeric adhesive may be made of room temperature curing silicone rubber, for example Silastic medical adhesive made by the Dow Corning Corporation. Often, the thickness of elastomeric adhesive about the tooth root may be greater than 0.1 millimeter, for example up to about 2 millimeters.

The artificial jaw member may be made of any desired material, for example plastic such as epoxy molding compound, or dental stone.

Also, a preformed, artificial gingiva made of an elastomer may be placed about the teeth, with the teeth passing through apertures in the molded, sheet-like gingiva, with the gingiva being pressed against the jaw member and adhered thereto with silicone rubber room temperature curing adhesive or the like. The gingiva, which is typically molded, may be made by other means if desired, being shaped to simulate the gingival tissue about the base of the teeth. Then, after application, the edges of the gingiva may be trimmed away to provide the desired clinical simulation, in which gingival pockets may be formed between the gingiva and the teeth and their roots. Thus, the novice dentist can probe the gingival pockets, with the probe end tending to strike the elastomeric adhesive about the tooth root, to provide a simulated clinical situation that is close to the reality of experience with an actual patient, in terms of the tactile sensations and "feel" of the procedure as experienced by the novice dentist.

It has been found that an artificial gingiva made of a certain type of elastomer provides a particularly realistic "feel" to the dental model of this invention, closely simulating the actual feel of living gum tissue. Such an artificial gingiva may be made of an elastomer having essentially the following characteristics when cured:

Tensile strength: at least 20 kg per $cm^2$ preferably 30 to 40 kg per $cm^2$;

Shore A durometer: 15 to 30, preferred; 18 to 22;

Elongation to Break: at least 300 percent, preferably 350 to 600 percent.

Preferably, the elastomer of which the artificial gingiva is made is silicone rubber. One preferred formulation is a silicone elastomer manufactured by Dow Corning Corporation Medical Products Division, Midland, Mich., and sold under the product number MDX 4-4210. Another preferred silicone elastomer formation for use as the artificial gingiva is the formulation sold by Factor II, Inc. of Lakeside, Ariz. under the product No. A2186 silicone elastomer.

The silicone formulation MDX 4-4210 has a tensile strength of about $22\pm 2$ kg per $cm^2$; a Shore A durometer of about 27-28.5; an elongation to break of about 300-360 percent; and a tear resistance as tested by ASTM D1938-67 of about 0.15-0.23.

The silicone formulation A2186 has a tensile strength of about 31-40 kg per $cm^2$; a Shore A durometer of about 19.3-20.5; an elongation to break of about 365-415 percent; and a tear resistance by the above-described test of about 0.3-0.38.

The tensile strength measurements upon which the above tensile strength data is based were performed in accordance with the article of Dorsey J. Moore, et al. title Evaluation of Polymeric Materials For Maxillofacial Prosthetics, *Journal of Prosthetic Dentistry*, Sept. 1977, Vol. 38. Pages 319-326, as particularly described on pages 320 and 321, based on the work as described in the article of footnote 8 of the Moore, et al. publication. The test was done to break, and the elongation to break measurements were simultaneously measured along with the tensile strengths.

In obtaining the tensile strength measurements, O-ring samples of the material to be tested were stretched on pegs clamped in the tensile tester, as described in the Dorsey J. Moore, et al. article cited above. Pegs in the tensile tester served as axles for freely rotating polytetrafluoroethylene wheels that had been machined to act as self-lubricating bearings. While being stretched, the rubber O-rings slipped freely around the wheel. The peg's axles were cast in chrome-cobalt alloy chosen for its strength and resistance to bending. Colinear alignment and absence of torsional forces on the test specimen during stretching were used. A C-cell for load measurement was installed in the tensile tester, with a cross head and recorder chart movement being established at 5.1 cm per minute. Full-scale load was 10 kg. in all measurements, which was adequate to break the O-rings.

One feature that is preferred for the elastomer of the artificial gingiva to have is a substantially nonlinear load/elongation curve, with the load increasing per unit of elongation substantially more at higher elongations than at lower elongations. When one graphs the elongation of an elastomer against the load required to create such elongation, some elastomers such as Dow Corning's Silastic 382 exhibit a straight line relationship between load and elongation. However, the preferred elastomers used to make the artificial gingiva of this invention are elongated more easily in terms of load increase at lower elongations, typically up to an elongation of about 250 percent. Thereafter, the elongation curve slopes upwardly more rapidly (with load graphed on the Y-axis) to form a curved line. For example, with respect to the above described silicone formulation MDX 4-4210, in a specific experiment a load of one kg. produced about a 100 percent elongation in the material. However, the load necessary to produce a 200 percent elongation was about 2.3 kg. as viewed from graph data. To produce a 300 percent elongation, a load of about 5 kg. was required. To produce a 350 percent elongation, a load of about 7 kg. was required. This data is taken from the graph of FIG. 5 of the previously cited article by Dorsey J. Moore, D.D.S., et al..

Particularly, vinyl silicone elastomer formulations which crosslink with silicon-bonded hydride groups in the presence of platinum are desirable for obtaining the desired physical properties as described above.

Both of the above specific elastomer formulations proposed for use in molding of the artificial gingiva, and those like them, exhibit substantial advantages, particularly (1) ease of initial molding and duplication, (2) good colorability, since it is desirable to add pigments so that the elastomer material is of the color of gum tissue, (3) a flexibility simulating that of human skin, (4) chemical and environmental stability, (5) resistance to tear and abrasion when molding to very thin edges, (6) and ease of cleaning without loss of surface or marginal detail. Accordingly, dental models of this invention which use the desired artificial gingiva made of the materials described herein exhibit significant improvements over the prior art in various ways, particularly the improved "feel", more closely simulating the teeth and jaw of an actual patient.

Thus, the model of this invention provides a system which closely simulates the clinical reality of patient examination, detection of various periodontal conditions which can be duplicated from student to student, and calibration exercises conducted between or among instructors. Also, the elastomeric adhesive which holds the tooth roots in the tooth-receiving sockets simulates the function of the ligaments of living teeth, and also permits the removal of the teeth from the sockets with relative ease, and their replacability, for a reduction of expense in the dental model program.

DESCRIPTION OF DRAWINGS

FIG. 1 is a side perspective view of a dental teaching model in accordance with this invention.

FIG. 2 is a front perspective view of the lower jaw of the dental teaching model of FIG. 1.

FIG. 3 is an exploded perspective view of the upper jaw of FIG. 1, showing how the gingiva and the individual teeth can be removed.

FIG. 4 is an enlarged, fragmentary, perspective view of a side portion of the dental model showing how a dental probe can manipulate the emplaced gingiva in a manner simulating clinical reality.

FIG. 5 is an enlarged, fragmentary, sectional view taken generally along line 5—5 of FIG. 2.

DESCRIPTION OF SPECIFIC EMBODIMENTS

Referring to the drawings, they show a dental model 10 comprising an upper jaw 12 and a lower jaw 14, which may be made of molded epoxy plastic or polyurethane which approximates the form of a conventional dental model of a human jaw, each jaw 12, 14, comprising a jaw ridge 16 in which a plurality of tooth-receiving sockets 18 are defined.

As shown, teeth 20 are provided, having simple roots 22 or multiple roots 24 in a manner that duplicates anatomically correct teeth. The teeth may be fabricated by a molding process from plastic molding compound or the like as desired.

As shown in FIG. 5, the retention of teeth 20 is illustrated. Tooth 20, having a root 22 or, equally, a multiple roots 24), resides in a socket 18 of one of the jaw members, being adhesively retained therein by a layer of elastomeric adhesive 26 which typically coats a substantial part of the respective tooth root, adhering the tooth root to the wall of the socket 18 in which the tooth resides. Thus, tooth 20 exhibits a resiliently seated characteristic that is similar to that of real teeth in a living jaw. However, at the same time, tooth 20 may be readily removed from the socket 18 in ridge 16 of either jaw member by cutting or tearing of elastomeric adhesive 26 for reuse of the tooth and/or the jaw member. It can be seen that the general spacing between the roots of the teeth in the walls of the sockets may be quite small, being at least 0.1 mm. or optionally somewhat larger, depending upon the desired resilient characteristics that one wishes the tooth to exhibit in its seating in the jaw.

Each of jaws 12, 14, in use, carry an artificial gingiva 28 which is shown particularly in FIG. 3 to be a contoured sheet of elastomeric material defining an indentation 30 to permit gingiva 28 to fit over jaw ridge 16 in the jaw in which it resides. Gingiva 28 has apertures 32 which are generally cut to fit the teeth 20 that project therethrough when gingiva 28 is properly mounted on its jaw. FIG. 5 in particular shows how artificial gingiva 28 can be mounted over jaw ridge 16 in a position to allow a tooth 20 to penetrate through one of the apertures 32. Additionally, the dental model may be configured by selective application of the adhesive 26, or other adhesive if desired, to define gingival pockets as desired. It can be seen that the posterior margin 34 between tooth 20 and gingival layer 38 can be rendered intact with adhesive, holding the gingival layer 28 in adhering relation to tooth 20. However, a gingival pocket 36 can be simulated by the absence of adhesive holding a portion the anterior margin of gingival layer 28 into adhering layer with tooth 20. This pocket can be further defined as desired by an absence of adhesive 26 at least part way down root 22 in a selected area, to provide a nonadhering area 38 at the tooth root 22, although tooth root 22 remains well secured to socket 18 by the remaining adhesive.

Because of this configuration, it becomes possible for a student to probe the pocket defined by adhesive-free areas 36, 38 with a conventional dental probe 40, as shown with respect to a tooth 20 having a multiple tooth root 24 in FIG. 4.

By the careful use of adhesive and its pattern of application, it becomes possible to easily manufacture clinical conditions such as gingival pockets in the dental model of this invention, to help familiarize novice dentists with actual clinical situations.

Gingiva 28 may be secured to its respective jaw by means of an appropriate adhesive. Also, when made of an elastomeric material having physical properties of the preferred materials described above, the artificial gingiva membrane formed will exhibit closely similar characteristics to actual gum tissue as one probes and manipulates it with dental instruments such as dental probe 40, to give the novice dentist good experience that closely approximates clinical experience.

Thus, the dental model of this invention provides substantially improved clinical realism, since teeth 20 are provided with a generally resilient mounting in a manner closely approximating living teeth in a real jaw, and the gum tissue exhibits a significantly improved "feel" upon manipulation with dental instruments, to provide an experience that is closer to clinical reality.

The above has been offered for illustrative purposes only, and is not intended to limit the scope of the invention of this application, which is as defined in the claims below.

That which is claimed is:

1. A dental model of teeth mounted in a jaw, which comprises:

an artificial jaw member defining tooth-receiving sockets;

teeth having roots of a shape of natural tooth roots, said roots being removably seated in said sockets; and elastomeric adhesive bonding said roots to the walls of the sockets in which said teeth reside, whereby said teeth exhibit a resiliently seated characteristic that is similar to that of real teeth in a living jaw, and said teeth may be readily removed from the jaw member for reuse thereof by cutting or tearing of the elastomeric adhesive.

2. The dental model of claim 1 in which said elastomeric adhesive is at least about 0.1 mm in thickness about a substantial portion of the root area of said teeth, to provide general spacing between said roots of the teeth and the walls of the socket.

3. The dental model of claim 1 in which a preformed, artificial gingiva made of an elastomer is placed about said teeth and on said jaw member in a manner to simulate gingival tissue.

4. The dental model of claim 3 in which the artificial gingiva is made of an elastomer having essentially the following physical characteristics when cured:

Tensile strength: at least 20 kg. per cm$^2$

Shore A Durometer: 15 to 30

Elongation to Break: at least 300%.

5. The dental model of claim 4 in which said elastomer has a tensile strength of 30 to 40; the Shore A Durometer is 18 to 22; and the Elongation to Break is 350 to 600.

6. The dental model of claim 4 in which said elastomer is silicone rubber.

7. The dental model of claim 4 in which said elastomer possesses a substantially nonlinear load/elongation curve, with the load increasing per unit of elongation substantially more at higher elongations than at lower elongations.

8. The dental model of claim 4 in which said elastomer defines a tear strength as tested by ASTM D1938-67 of at least 0.15.

9. A dental model of teeth mounted in a jaw, which comprises:

an artificial jaw member defining tooth-receiving sockets;

teeth having roots of a shape of natural tooth roots, said roots being removably seated in said sockets;

elastomeric adhesive bonding said roots to the walls of the sockets in which said teeth reside, said elastomeric adhesive being at least 0.1 mm. in thickness about most of the root area of said teeth, to provide general spacing between said roots of the teeth and the walls of the sockets, whereby said teeth exhibit a resiliently seated characteristic that is similar to that of real teeth in a living jaw, and said teeth may be readily removed from the jaw member for reuse thereof by cutting or tearing of the elastomeric adhesive; and a preformed, artificial gingiva made of an elastomer placed about said teeth and on said jaw member in a manner to simulate gingival tissue;

said elastomer possessing a substantially non-linear load/elongation curve, with the load increasing per unit of elongation substantially more at higher elongations than at lower elongations.

10. The dental model of claim 9 in which the artificial gingiva is made of an elastomer having essentially the following physical characteristics when cured:

Tensile strength: at least 20 kg. per $cm^2$
Shore A Durometer: 15 to 30
Elongation to Break: at least 300%.

11. The dental model of claim 10 in which said elastomer has a tensile strength of 30 to 40; the Shore A Durometer is 18 to 22; and the Elongation to Break is 350 to 600.

12. The dental model of claim 11 in which said elastomer is silicone rubber.

13. The dental model of claim 10 in which said elastomer defines a tear strength as tested by ASTM D1938-67 of at least 0.15.

14. A dental model of teeth mounted in a jaw, which comprises:

an artificial jaw member defining tooth-receiving sockets;

teeth having roots, said roots being removably seated in said sockets;

and a preformed, artificial gingiva made of an elastomer placed about said teeth and on said jaw member in a manner to simulate gingival tissue, said artificial gingiva being made of an elastomer having the essentially following physical characteristics when cured:

Tensile Strength: at least 20kg. per $cm^2$
Shore A Durometer: 15 to 30
Elongation to Break: at least 300% said elastomer possessing a substantially non-linear load/elongation curve, with the load increasing per unit of elongation substantially more at higher elongations than at lower elongations.

15. The dental model of claim 14 in which said elastomer defines a tear strength as tested by ASTM D1938-67 of at least 0.15.

16. The dental model of claim 15 in which said elastomer has a tensile strength of 30 to 40; the Shore A Durometer is 18 to 22; and the Elongation to Break is 350 to 600.

17. The dental model of claim 14 in which said elastomer is silicone rubber.

18. The dental model of claim 1 in which a space is provided in the elastomeric adhesive bonding between said roots and the walls of the sockets to simulate a gingival pocket.

19. The dental model of claim 9 in which a space is provided in the elastomeric adhesive bonding between said roots and the walls of the sockets to simulate a gingival pocket.

* * * * *